US 9,600,743 B2

(12) United States Patent
Anderson et al.

(10) Patent No.: US 9,600,743 B2
(45) Date of Patent: Mar. 21, 2017

(54) DIRECTING FIELD OF VISION BASED ON PERSONAL INTERESTS

(71) Applicant: International Business Machines Corporation, Armonk, NY (US)

(72) Inventors: Brian M. Anderson, Dunwoody, GA (US); Scott B. Katzman, Dallas, GA (US); Jacob C. Schneider, Lawrenceville, GA (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 14/316,890

(22) Filed: Jun. 27, 2014

(65) Prior Publication Data

US 2015/0381898 A1 Dec. 31, 2015

(51) Int. Cl.
| | | |
|---|---|---|
| *H04N 5/225* | (2006.01) | |
| *G06K 9/62* | (2006.01) | |
| *H04N 1/21* | (2006.01) | |
| *G06K 9/00* | (2006.01) | |
| *G06F 3/048* | (2013.01) | |

(52) U.S. Cl.
CPC ........... *G06K 9/6202* (2013.01); *G06F 3/048* (2013.01); *G06K 9/00604* (2013.01); *H04N 1/2129* (2013.01)

(58) Field of Classification Search
CPC ............. G06K 9/6202; G06K 9/00604; H04N 1/2129; G06F 3/048
See application file for complete search history.

(56) References Cited

U.S. PATENT DOCUMENTS

| 6,964,023 B2 | 11/2005 | Maes et al. |
|---|---|---|
| 7,434,176 B1 | 10/2008 | Froloff |
| 7,547,279 B2 | 6/2009 | Kim et al. |

(Continued)

FOREIGN PATENT DOCUMENTS

| CN | 102906623 A | 1/2013 |
|---|---|---|
| KR | 20120035100 A | 4/2012 |

(Continued)

OTHER PUBLICATIONS

"Smartglass"—Wikipedia, the free encyclopedia; Jun. 2014; http://en.wikipedia.org/wiki/Smartglasses.

(Continued)

*Primary Examiner* — Tat Chio
(74) *Attorney, Agent, or Firm* — Alexa A. Ashworth; Brian M. Restauro

(57) ABSTRACT

A method for directing the field of vision based on personal interests. The method includes receiving a keyword and/or an image file and processing the keyword and/or image file to generate data representing a user interest. The method includes receiving a video input from a camera representative of the field of vision of the camera and processing the video input to identify a visible element in the field of vision of the camera. The method further includes comparing the visible element in the field of vision of the camera and the data representing the user interest to determine whether the visible element is of interest to the user. A notification is provided to the user for identified visible elements that are of interest to the user.

20 Claims, 4 Drawing Sheets

(56) References Cited

U.S. PATENT DOCUMENTS

| | | | |
|---|---|---|---|
| 7,729,914 | B2 | 6/2010 | Tato et al. |
| 8,209,182 | B2 | 6/2012 | Narayanan |
| 8,254,699 | B1 | 8/2012 | Zhao et al. |
| 8,407,055 | B2 | 3/2013 | Asano et al. |
| 8,462,996 | B2 | 6/2013 | Moon et al. |
| 8,482,859 | B2 | 7/2013 | Border et al. |
| 8,510,166 | B2 | 8/2013 | Neven |
| 2002/0044152 | A1 | 4/2002 | Abbott, III et al. |
| 2004/0034652 | A1 | 2/2004 | Hofmann et al. |
| 2006/0239645 | A1* | 10/2006 | Curtner ............... G06F 17/3079 386/228 |
| 2007/0106138 | A1 | 5/2007 | Beiski et al. |
| 2008/0052080 | A1 | 2/2008 | Narayanan |
| 2008/0096533 | A1 | 4/2008 | Manfredi et al. |
| 2008/0221401 | A1 | 9/2008 | Derchak et al. |
| 2009/0015677 | A1* | 1/2009 | Harrington ............ H04N 5/222 348/172 |
| 2009/0285456 | A1 | 11/2009 | Moon et al. |
| 2010/0036660 | A1 | 2/2010 | Bennett |
| 2011/0007142 | A1 | 1/2011 | Perez et al. |
| 2011/0040155 | A1 | 2/2011 | Guzak et al. |
| 2012/0062596 | A1 | 3/2012 | Bedi et al. |
| 2012/0116186 | A1 | 5/2012 | Shrivastav et al. |
| 2012/0212406 | A1 | 8/2012 | Osterhout et al. |
| 2012/0232968 | A1 | 9/2012 | Calman et al. |
| 2012/0323087 | A1 | 12/2012 | Leon Villeda et al. |
| 2013/0018837 | A1 | 1/2013 | Lee |
| 2013/0050260 | A1 | 2/2013 | Reitan |
| 2013/0155229 | A1* | 6/2013 | Thornton ................ H04N 7/18 348/143 |
| 2013/0183646 | A1 | 7/2013 | Lusted et al. |
| 2013/0187929 | A1 | 7/2013 | Perez et al. |
| 2013/0222371 | A1 | 8/2013 | Reitan |
| 2013/0229433 | A1 | 9/2013 | Reitan |
| 2013/0235034 | A1 | 9/2013 | Reitan |
| 2013/0235079 | A1 | 9/2013 | Reitan |
| 2013/0249947 | A1 | 9/2013 | Reitan |
| 2013/0307842 | A1 | 11/2013 | Grinberg et al. |
| 2014/0019867 | A1 | 1/2014 | Lehtiniemi et al. |
| 2014/0022370 | A1 | 1/2014 | Sohn et al. |
| 2014/0063061 | A1 | 3/2014 | Reitan |
| 2014/0068472 | A1 | 3/2014 | Guzak et al. |
| 2014/0089399 | A1 | 3/2014 | Chun et al. |
| 2014/0091897 | A1 | 4/2014 | Lemmey et al. |
| 2014/0112556 | A1 | 4/2014 | Kalinli-Akbacak |
| 2014/0136450 | A1 | 5/2014 | Lee |
| 2016/0055377 | A1 | 2/2016 | Anderson et al. |
| 2016/0055378 | A1 | 2/2016 | Anderson et al. |

FOREIGN PATENT DOCUMENTS

| | | |
|---|---|---|
| WO | 2012139271 A1 | 10/2012 |
| WO | 2013024470 A1 | 2/2013 |
| WO | 2013032955 A1 | 3/2013 |
| WO | 2013171731 A1 | 11/2013 |

OTHER PUBLICATIONS

Hajimirza, S et al. "Reading Users' Minds From Their Eyes: A Method for Implicit Image Annotation." IEEE Transactions on Multimedia, vol. 14, No. 3, pp. 805-815, Jun. 2012.

"Cars could soon monitor our Emotions: Device reads facial expression to prevent road rage." http://www.dailymail.co.uk/sciencetech/article-2580969/Cars-soon-monitor-Emotions-Device-reads-facial-expressions-identify-anger-prevent-road-rage.html; Mar. 2014.

"Emotion-Recognizing Smart Glasses." http://www.trendhunter.com/trends/emotient-app; Mar. 2014.

Bednarik, R et al. "What do you want to do next: A novel approach for intent prediction in gaze-based interaction." Association for Computing Machinery, Inc; ACM 978-1-4503-1225-7/12/0003; pp. 83-90, Mar. 2012.

Yu, Y et al. "An Automatic Method for Detecting Objects of Interest in Videos Using Surprise Theory." Proceeding of the IEEE International Conference on Information and Automation, Shenyang, China, pp. 620-625, Jun. 2012.

"Spit-Powered Fuel Cells Could Power Your Implanted Chip." http://animalnewyork.com/2014/spit-powered-fuel-cells-power-implanted-chip/; Apr. 2014.

Huang, J et al. "Automatic Detection of Object of Interest and Tracking in Active Video." Advances in Multimedia Information Processing—PCM 2009, Lecture Notes in Computer Science(LNCS) 5879, pp. 368-380, 2009.

Scharr, J. "Facial-Recognition Tech Can Read Your Emotions", http://www.livescience.com/42975-facial-recognition-tech-reads-emotions.html; Jan. 2014.

Schut, M. et al. "Biometrics for Emotion Detection (BED): Exploring the combination of Speech and ECG", Proceedings of the 1st International Workshop on Bio-inspired Human-Machine Interfaces and Healthcare Applications, In conjunction with BIOSTEC 2010, Valencia, Spain, Jan. 2010.

Conati, C et al. "A Study on Using Biometric Sensors for Monitoring User Emotions in Educational Games", Department of Computer Science, University of British Columbia; 2003.

"Real-Time Analytics to Identify Visual Objects of Interest", U.S. Appl. No. 14/462,922, filed Aug. 19, 2014.

IBM Appendix P, list of IBM patents or patent applications treated as related, Oct. 9, 2014.

"Real-Time Analytics to Identify Visual Objects of Interest", U.S. Appl. No. 14/515,125, filed Oct. 15, 2014.

IBM Appendix P, list of IBM patents or patent applications treated as related, Oct. 27, 2014.

* cited by examiner

DIRECTING FIELD OF VISION BASED ON PERSONAL INTERESTS

BACKGROUND OF THE INVENTION

The present invention relates generally to the field of object recognition, and more particularly to directing the field of vision based on personal interests.

Many types of recognition technologies have been developed to recognize things of interest, such as people, places, objects, and locations. For example, location recognition software, in conjunction with global positioning systems (GPS) satellites, may provide physical location information to a user, and facial recognition software may implement algorithms to identify a person from a photo or video with varying degrees of accuracy. In another example, recognition technology, such as optical character recognition (OCR), may be employed to recognize text from an image or video.

Smart glasses, or computerized glasses with the capability of reflecting projected digital images as well as allowing a user to see through a display (i.e., a heads up display, or HUD), are an emerging technology. Some smart glasses have the capabilities of supporting wireless technologies, retrieving data, and responding to voice commands from a user. Additionally, some smart glasses contain a camera or video device which has the capability of capturing content within from the field of vision of a user.

SUMMARY

According to one embodiment of the present invention, a method for directing the field of vision based on personal interests is provided. The method for directing the field of vision based on personal interests may include receiving at least one selected from the group consisting of a keyword and an image file, and processing the at least one selected from the group consisting of the keyword and the image file to generate data representative of an interest of a user. The method may include receiving video input from a camera comprising data representative of a field of vision of the camera. The method may include processing the video input from the camera to identify a visible element in the field of vision of the camera. The method may further include comparing the visible element in the field of vision of the camera and the data representative of the interest of the user to determine whether the visible element is of interest to the user. A notification is provided to the user when the identified visible element is of interest to the user.

DETAILED DESCRIPTION

People are constantly provided with advertisements, notices, and announcements, among other types of communications, to view. Usually, it is nearly impossible for a person to stop and read every communication of interest in its entirety, and further, certain communications may not even be of interest to a particular person. Embodiments of the present invention provide a method for indicating to a user where to focus the field of vision in order to view objects, in near real-time, which are of personal interest to the user. In this manner, as a user navigates and experiences an environment, the user's attention may be directed to information that is of interest to the user but might otherwise go unnoticed.

Figure 1:
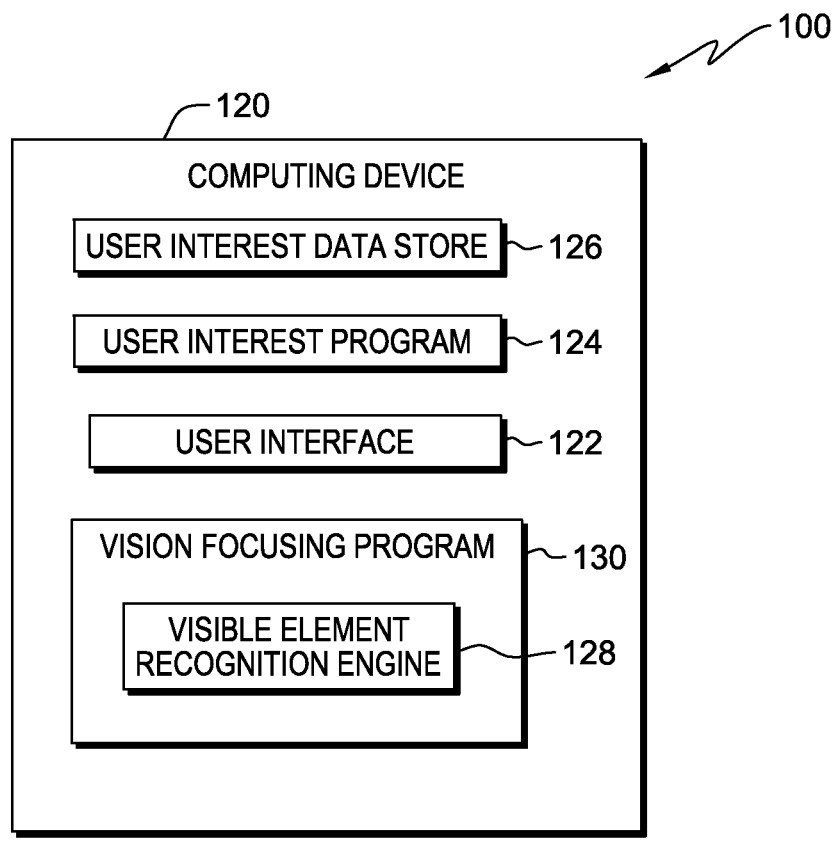
FIG. 1 is a functional block diagram illustrating an environment, in accordance with an embodiment of the present invention.

The present invention will now be described in detail with reference to the Figures. FIG. 1 is a functional block diagram illustrating a computing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention, as recited by the claims.

Computing environment 100 includes computing device 120. In various embodiments of the present invention, computing device 120 can be a laptop computer, a tablet computer, a netbook computer, a personal computer (PC), a desktop computer, a personal digital assistant (PDA), a smart phone, or any programmable electronic device capable of executing computer readable program instructions. In a preferred embodiment, computing device 120 is implemented with smart glasses. In general, computing device 120 is representative of any electronic device, or combination of electronic devices, that has a photo and/or video capture device and is capable of executing machine-readable program instructions in accordance with embodiments of the present invention, as described in greater detail with regard to FIG. 5.

Computing device 120 includes user interface (UI) 122, user interest program 124, user interest data store 126, visible element recognition engine 128, and vision focusing program 130. UI 122 may be, for example, a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. UI 122 is capable of receiving data, user commands, and data input modifications from a user. UI 122 is also capable of communicating with user interest program 124 and vision focusing program 130.

User interest program 124 receives information detailing preferences and interests of a user, creates user interest files, and stores the user interest files in data store 126 for future access, in accordance with embodiments of the present invention.

User interest data store 126 stores user interest files and preferences pertaining to interests of a user. In this exemplary embodiment, user interest data store 126 resides locally on computing device 120. In other embodiments, user interest data store 126 can be hosted remotely and accessed via a network (e.g., a local area network (LAN), a wide area network (WAN) such as the Internet, or a combination of the two). User interest data store 126 can be implemented with any data store architecture known in the art, such as a relational database, an object-oriented database, and/or one or more tables.

Vision focusing program 130, in conjunction with visible element recognition engine 128, analyzes captured video data to identify visible elements in a user's field of vision that match user interests stored in user interest data store 126. The term "visible elements," as used in the specification and claims, refers broadly to elements identified in the analyzed image and/or video input, including, but not limited to, faces, objects, text, logos, locations, and combinations thereof. Vision focusing program 130, in conjunction with user interface 122, may then provide notifications to the user that direct the user to the matched visible elements.

In this exemplary embodiment, visible element recognition engine 128 employs recognition software to analyze image and video input and output one or more identified visible elements to vision focusing program 130. Visible element recognition engine 128 may be implemented with any suitable OCR and geometry processing technology known in the art. For example, visible element recognition engine 128 can utilize OCR, along with point cloud processing algorithms available in the Point Cloud Library (PCL), for analyzing image and video input and identifying visible elements therein. Although depicted as separate components, vision focusing program 130 and visible element recognition engine 128 may be partially or fully integrated with UI 122.

It should be understood that, for illustrative purposes, FIG. 1 does not show other computer systems and elements which may be present when implementing embodiments of the present invention. For example, in certain embodiments, vision focusing program 130 may communicate with one or more storage server computing devices to access user interest data store 126 in instances where user interest data store 126 is remotely hosted. Similarly, vision focusing program 130 may communicate with one or more server computing devices via a network for additional computational power in instances where the computational power and resources of computing device 120 are limited.

Figure 2:
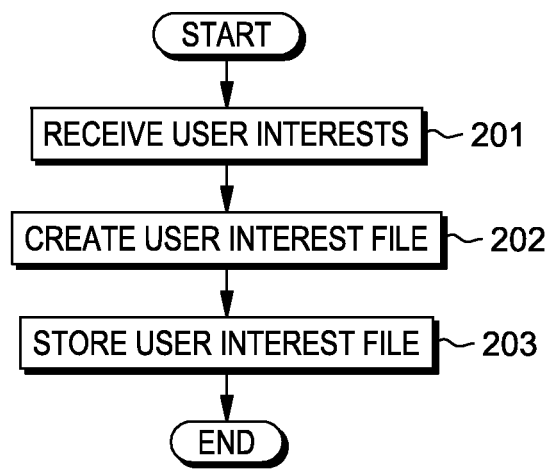
FIG. 2 is a flowchart depicting operational steps for creating a user interest file, in accordance with an embodiment of the present invention.

FIG. 2 is a flowchart depicting operational steps for creating user interest files, in accordance with an embodiment of the present invention.

In step 201, user interest program 124 receives a set of user interests. In this exemplary embodiment, user interest program 124 receives a list of user preferences and interests input by a user of computing device 120. User interest program 124 receives one or more keywords and image files (e.g., in JPEG or GIF format) that depict one or more people, places, or things that reflect an interest of the user. An interest of the user may be embodied in one or more keywords alone, one or more image files alone, and/or in combinations of both. For example, a user interested in baseball may input the keyword "baseball," a picture of a baseball stadium, and the logo of a favorite baseball team as a set of personal interests. In this exemplary embodiment, vision focusing program 130 may also access the Internet to retrieve additional keywords and/or image files that are related to interests entered by the user. In addition, user interest program 124 may continually receive updates to user interest files in real-time from a user depending on the changing preferences or interests of the user.

In step 202, user interest program 124 creates a user interest file from the set of received user interests. In this exemplary embodiment, vision focusing program 130 creates a computer readable file which includes the set of all received user interests, indicating the preferences and personal interests of a user. A user may also create more than one user interest file for different anticipated scenarios. For example, a user may use user interest program 124 to create a user interest file which contains keywords and images associated with historic buildings and museums prior to travelling to Washington D.C., and the user may create a user interest file which contains keywords and images associated with favorite local restaurants or retail stores when using the invention locally. Similarly, user interest data store 126 may store multiple files, where each file contains interests and preferences for a different user.

In step 203, user interest program 124 stores the created user interest files in user interest data store 126. In this exemplary embodiment, vision focusing program 130 stores the created interest files locally on computing device 120. In other embodiments, the user interest files may be stored remotely, such as on a server computing device or another computing device belonging to the user (e.g., a laptop computer), and may be accessed via a network and/or via standard input/output cables (e.g., USB cables) connected to the computing device.

Figure 3:
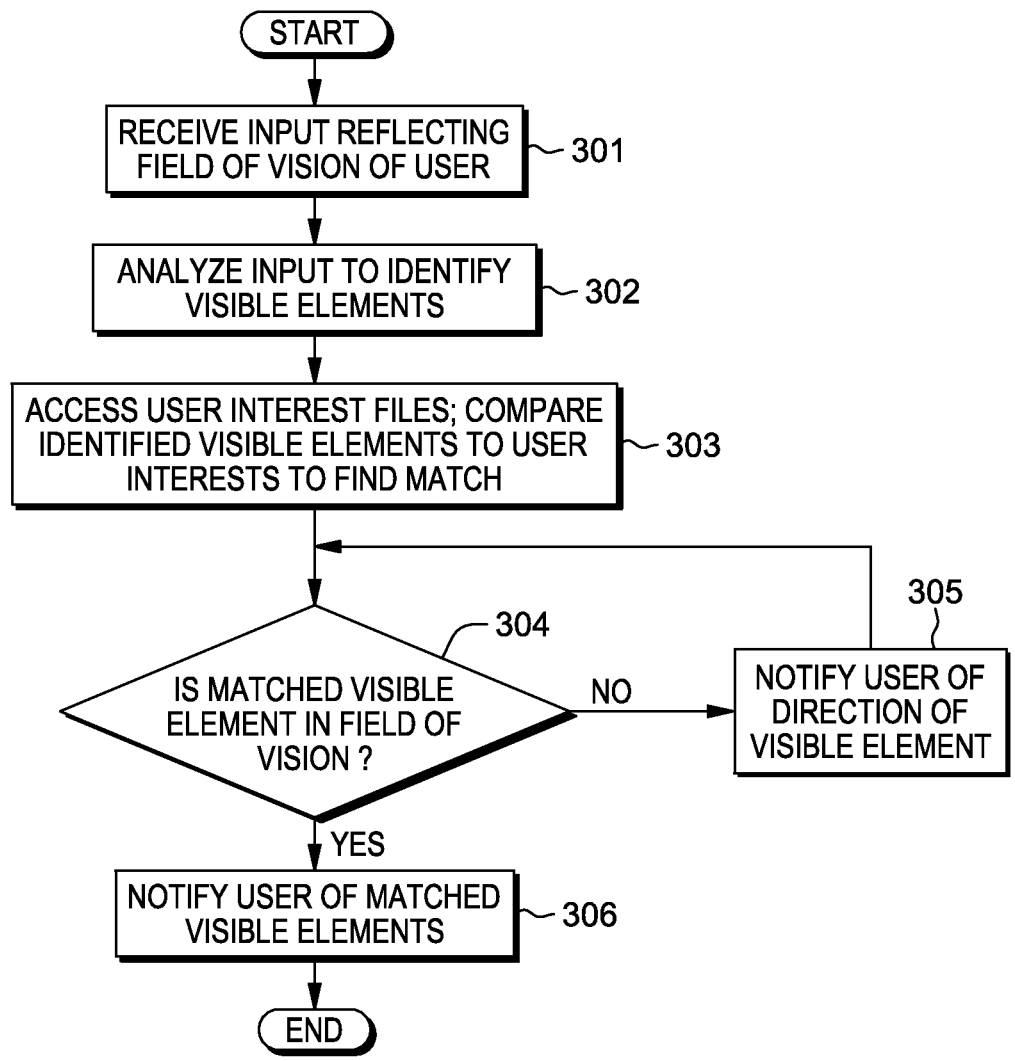
FIG. 3 is a flowchart depicting operational steps for directing a user to an object of interest, in accordance with an embodiment of the present invention.

FIG. 3 is a flowchart depicting operational steps of vision focusing program 130 for directing a user to an object of interest, in accordance with an embodiment of the present invention. The operational steps of FIG. 3 may be performed, for example, while the user is walking through an environment.

In step 301, vision focusing program 130 receives input reflecting the field of vision of the user. In this exemplary embodiment, vision focusing program 130 receives input from a video capture device (e.g., a camera) on computing device 120, where the field of vision of the video capture device is coextensive with the user's field of vision (i.e., the video capture device can see everything the user can see). For example, where computing device 120 is implemented with smart glasses or a smartphone, vision focusing program 130 may receive video input from a persistent video capture device that is built into computing device 120. In general, vision focusing program 130 may receive input detailing all or a portion of the field of vision of a user through any image or video capture device, whether built into computing device 120 or provided as a separate component.

In step 302, vision focusing program 130 calls visible element recognition engine 128 to analyze the input to identify visible elements in the field of vision of the user, which are then returned to vision focusing program 130. In this exemplary embodiment, visible element recognition engine 128 uses OCR and geometry recognition algorithms (e.g., point cloud analysis) to identify the visible elements within the captured video or image. For example, if a user passes an advertisement for a baseball game, visible element recognition engine 128 may identify the word "baseball" and a baseball team's logo from captured video input. In general, any suitable text and object recognition algorithms and/or programs compatible with visible element recognition engine 128 and vision focusing program 130 may be used, including those which might be necessary to account for scaled input images, rotated input images, and/or translated input images.

In step 303, vision focusing program 130 accesses user interest files stored in user interest data store 126 and compares the identified visible elements to the user interests contained in the user interest files to find one or more matches. In this exemplary embodiment, vision focusing program 130 compares the contents of the accessed user interest files to the identified visible elements, looking for a match in objects and/or text, according to preferences of the user (e.g., a tolerance setting for how similar identified visible elements must be to keywords and/or images contained in the user interest files to constitute a match). Vision focusing program 130 may also incorporate word and object comparison extensions, which allows for further comparison options between the user interest files and the identified visible elements. For example, vision focusing program 130 may identify a baseball hat and a baseball shirt when the user has inputted the keywords "baseball apparel" as a user interest.

In this exemplary embodiment, vision focusing program 130 also incorporates training techniques to continually learn the interests of a user and to better identify visible elements that are of interest to a user. For example, a user may upload a list of keywords and objects that are dislikes, which vision focusing program 130 may ignore when identifying visible elements of interest to the user. In another example, vision focusing program 130 may receive positive or negative feedback ratings from a user for matches, depending on whether the user is interested or not interested in the identified visible element.

In step 304, vision focusing program 130 determines whether a matched visible element is within the field of vision of the user by determining whether the matched visible element is found in the most recently received video input. In this exemplary embodiment, at some point in time the matched visible element must be within the field of vision of the user to be detected; however, for a variety of reasons, the matched visible element may no longer be in the field of vision of the user. For example, there might be processing lag, or the user might be glancing around, or moving through the environment.

If, in step 304, vision focusing program 130 determines that the matched visible element is not in the field of vision of the user, then, in step 305, vision focusing program 130 provides a notification to the user of the direction of the matched visible element. In this exemplary embodiment, vision focusing program 130 communicates with user interface 122 and a display of computing device 120 to provide a visual notification to a user. For example, vision focusing program 130 may cause an arrow to appear in the display, indicating to the user in which direction the user should turn to view the matched visible element (depicted in FIG. 4A). In other embodiments, vision focusing program 130 may communicate with a speaker to provide an aural notification to the user. For example, vision focusing program 130 may cause a voice notification which speaks to the user, indicating in which direction the user should turn to view the matched visible element. In yet another embodiment, vision focusing program 130 may provide a haptic notification to be provided to the user. For example, vision focusing program 130 may cause a small motor to vibrate on the left side of computing device 120 (e.g., a left arm on a pair of smart glasses), indicating that the user should turn left in order to view the matched visible element. In this exemplary embodiment, vision focusing program 130 continues to provide a notification to the user of the direction of the matched visible element until, in step 304, the matched visible element is within the field of vision of the user. In other embodiments, vision focusing program 130 continues to provide a notification to the user of the direction of the matched visible element until the user dismisses the notification or a specified amount of time elapses (i.e., a time out period).

If, in step 304, vision focusing program 130 determines that the matched visible element is in the field of vision of the user, then, in step 306, vision focusing program 130 communicates with user interface 122 and a display of computing device 120 to provide a notification to the user of the matched visible element. For example, the matched element may be indicated to the user by shading the area of the display over the matched visible element darker or lighter. In other embodiments, the matched visible element may be indicated to the user by highlighting the matched visible element using a color, or displaying an arrow beside the matched visible element.

Accordingly, by performing the operational steps of FIG. 3, objects that are of personal interest to a user are identified in the field of vision of a user, and the user is notified and directed to the objects of personal interest. By repeatedly performing the operational steps (e.g., every three seconds or less), a user can be notified of things of interest to the user as the user is navigating an environment in near real-time.

Figure 4A:
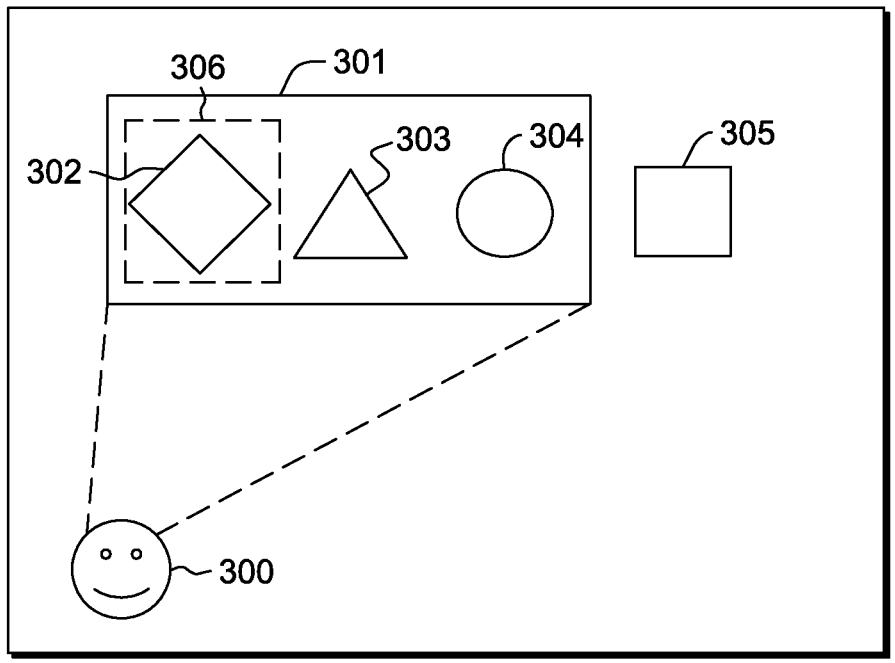
FIG. 4A depicts an example in which an object of interest that matches a user interest is highlighted for a user in the field of vision, in accordance with an embodiment of the present invention.

FIG. 4A depicts an example in which an object of interest that matches a user interest is highlighted for a user in the field of vision, in accordance with an embodiment of the present invention. Field of vision 301 is the display area in the field of vision seen by user 300, for example, the display area of a HUD. Objects 303, 304, and 305 are each objects which are not of interest to the user, and objects 303 and 304 are within field of vision 301, while object 305 is not within field of vision 301. Object 302 is an object of user interest and is within the field of vision of user 300. Highlight 306 is an indicator, which depicts which object within the field of vision of a user is the identified object of interest. As depicted in FIG. 4A, object 302 (the object of interest) is within the field of vision of the user, and highlight 306 is a box around object 302 to indicate to user 300 where the identified object of interest is located within field of vision 301.

Figure 4B:
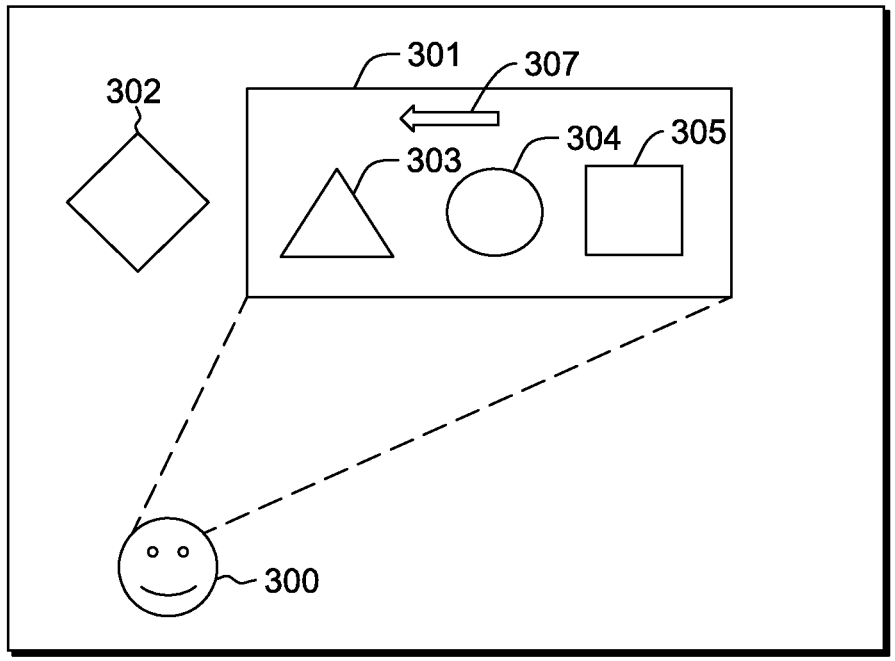
FIG. 4B depicts an example in which a user's field of vision is directed to an object of interest outside of the field of vision, in accordance with an embodiment of the present invention.

FIG. 4B depicts an example in which a user's field of vision is directed to an object of interest outside of the field of vision, in accordance with an embodiment of the present invention. Field of vision 301 is the display area in the field of vision seen by user 300, for example, the display area of a HUD. Object 302 is an object of interest to a user. Objects 303, 304, and 305 are each objects in the field of vision of the user, which are not of interest to the user. Direction arrow 307 is an arrow in the display, which instructs user 300 in which direction to turn in order to view the object of interest (object 302) within the field of vision. As depicted in FIG. 4B, object 302 is not within the field of vision of user 300, so direction arrow 307 indicates to user 300 that turning the field of vision to the left will allow object 302 to be viewed within the field of vision.

Figure 5:
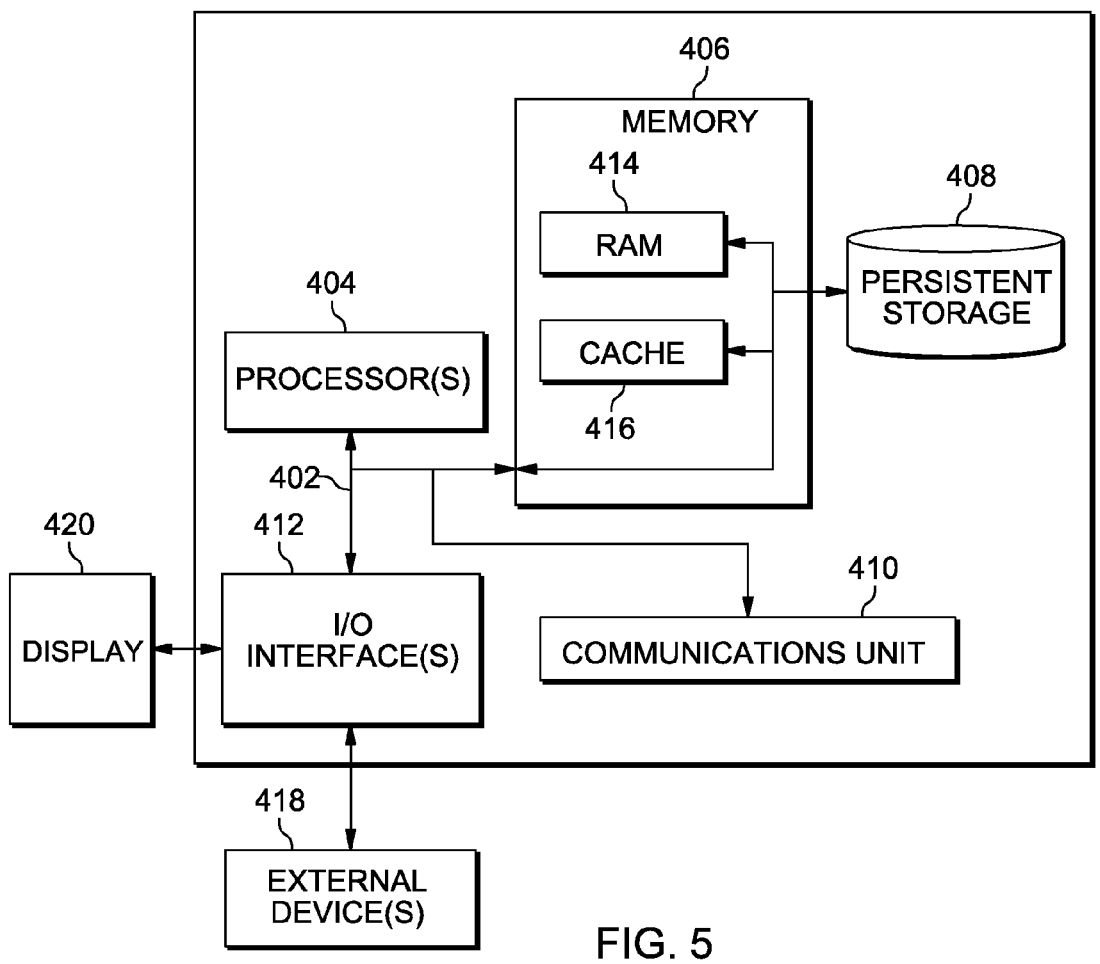
FIG. 5 depicts a block diagram of internal and external components of a data processing system, such as the computing device of FIG. 1, in accordance with an embodiment of the present invention.

FIG. 5 depicts a block diagram of components of computing device 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User interest program 124, user interest data store 126, visible element recognition engine 128, and vision focusing program 130 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including computing device 120. In these examples, communications unit 410 includes one or more network interface cards. Communications unit 410 may provide communications through the use of either or both physical and wireless communications links. User interest program 124 and vision focusing program 130 may be downloaded to persistent storage 408 through communications unit 410.

I/O interface(s) 412 allows for input and output of data with other devices that may be connected to computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user interest program 124, user interest data store 126, visible element recognition engine 128, and vision focusing program 130 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, at least one selected from the group consisting of a keyword and an image file;
   processing, by one or more processors, the at least one selected from the group consisting of the keyword and the image file, to generate data representative of an interest of a user;
   receiving, by one or more processors, video input from a camera as the user navigates an environment in real-time, wherein the video input from the camera comprises data representative of a field of vision of the camera;
   processing, by one or more processors, the video input from the camera to identify, in real-time, a visible element in the field of vision of the camera;
   comparing, by one or more processors, the visible element in the field of vision of the camera and the data representative of the interest of the user to determine whether the visible element is of interest to the user; and
   responsive to determining that the visible element is of interest to the user, providing a notification to the user.

2. The method of claim 1, further comprising:
   determining, by one or more processors, whether the visible element is in the field of vision of the camera; and
   responsive to determining that the visible element is in the field of vision of the camera, visually notifying the user of the visible element.

3. The method of claim 2, further comprising:
   responsive to determining that the visible element is not within the field of vision of the camera, providing an indication to the user of a direction of the visible element relative to the field of vision of the camera.

4. The method of claim 3, wherein the indication to the user of the direction of the visible element relative to the field of vision of the camera comprises one or more of: a visual notification; an aural notification; and a haptic notification.

5. The method of claim 2, wherein responsive to determining that the visible element is not within the field of vision of the camera, providing an indication to the user of a direction to turn in order to see the visible element.

6. The method of claim 2, wherein visually notifying the user of the visible element further comprises at least one of: shading the visible element; highlighting the visible element; and displaying an arrow beside the visible element.

7. The method of claim 1, wherein the image file comprises data representative of one or more of: text; a two-dimensional object; and a three-dimensional object.

8. The method of claim 1, wherein the field of vision of the camera is coextensive with a real-time field of vision of the user.

9. A computer program product comprising:
   a computer readable storage medium and program instructions stored on the computer readable storage medium, the program instructions comprising:
   program instructions to receive at least one selected from the group consisting of a keyword and an image file;
   program instructions to process the at least one selected from the group consisting of the keyword and the image file, to generate data representative of an interest of a user;

program instructions to receive video input from a camera as the user navigates an environment in real-time, wherein the video input from the camera comprises data representative of a field of vision of the camera;

program instructions to process the video input from the camera to identify, in real-time, a visible element in the field of vision of the camera;

program instructions to compare the visible element in the field of vision of the camera, and the data representative of the interest of the user to determine whether the visible element is of interest to the user; and responsive to determining that the visible element is of interest to the user, program instructions to provide a notification to the user.

10. The computer program product of claim 9, further comprising:

program instructions to determine whether the visible element is in the field of vision of the camera; and responsive to determining that the visible element is in the field of vision of the camera, program instructions to visually notify the user of the visible element.

11. The computer program product of claim 10, further comprising:

responsive to determining that the visible element is not within the field of vision of the camera, program instructions to provide an indication to the user of a direction of the visible element relative to the field of vision of the camera.

12. The computer program product of claim 11, wherein the indication to the user of the direction of the visible element relative to the field of vision of the camera comprises one or more of: a visual notification; an aural notification; and a haptic notification.

13. The computer program product of claim 10, wherein responsive to determining that the visible element is not within the field of vision of the camera, program instructions to provide an indication to the user of a direction to turn in order to see the visible element.

14. The computer program product of claim 10, wherein program instructions to visually notify the user of the visible element further comprise at least one of: shading the visible element, highlighting the visible element, and displaying an arrow beside the visible element.

15. The computer program product of claim 9, wherein the image file comprises data representative of one or more of: text; a two-dimensional object; and a three-dimensional object.

16. The computer program product of claim 9, wherein the field of vision of the camera is coextensive with a real-time field of vision of the user.

17. A computer system comprising:

one or more computer processors;

one or more computer readable storage media;

program instructions stored on the one or more computer readable storage media for execution by at least one of the one or more processors, the program instructions comprising:

program instructions to receive at least one selected from the group consisting of a keyword and an image file;

program instructions to process the at least one selected from the group consisting of the keyword and the image file, to generate data representative of an interest of a user;

program instructions to receive video input from a camera as the user navigates an environment in real-time, wherein the video input from the camera comprises data representative of a field of vision of the camera;

program instructions to process the video input from the camera to identify, in real-time, a visible element in the field of vision of the camera;

program instructions to compare the visible element in the field of vision of the camera and the data representative of the interest of the user to determine whether the visible element is of interest to the user;

and responsive to determining that the visible element is of interest to the user, program instructions to provide a notification to the user.

18. The computer system of claim 17, further comprising:

program instructions to determine whether the visible element is in the field of vision of the camera; and responsive to determining that the visible element is in the field of vision of the camera, program instructions to visually notify the user of the visible element.

19. The computer system of claim 18, further comprising:

responsive to determining that the visible element is not within the field of vision of the camera, program instructions to provide an indication to the user of a direction of the visible element relative to the field of vision of the camera.

20. The computer system of claim 18, wherein responsive to determining that the visible element is not within the field of vision of the camera, program instructions to provide an indication to the user of a direction to turn in order to see the visible element.

* * * * *